(12) United States Patent
Yu et al.

(10) Patent No.: US 7,379,848 B2
(45) Date of Patent: *May 27, 2008

(54) EVENT-BASED SYSTEM AND PROCESS FOR RECORDING AND PLAYBACK OF COLLABORATIVE ELECTRONIC PRESENTATIONS

(75) Inventors: Bin Yu, Urbana, IL (US); Yong Rui, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 59 days.

This patent is subject to a terminal disclaimer.

(21) Appl. No.: 11/390,895

(22) Filed: Mar. 27, 2006

(65) Prior Publication Data

US 2006/0167662 A1  Jul. 27, 2006

Related U.S. Application Data

(63) Continuation of application No. 10/973,186, filed on Oct. 25, 2004, now Pat. No. 7,099,798.

(51) Int. Cl.
*G21C 17/00* (2006.01)
*G06F 11/30* (2006.01)

(52) U.S. Cl. ........................ 702/186; 702/188
(58) Field of Classification Search ................ 702/186, 702/188, 189; 709/201, 204, 205
See application file for complete search history.

(56) References Cited

U.S. PATENT DOCUMENTS

| | | | |
|---|---|---|---|
| 5,717,869 A * | 2/1998 | Moran et al. ............. | 715/716 |
| 5,786,814 A * | 7/1998 | Moran et al. ............. | 715/720 |
| 5,890,177 A | 3/1999 | Moody et al. | |
| 6,067,551 A | 5/2000 | Brown et al. | |
| 6,119,147 A * | 9/2000 | Toomey et al. ............. | 709/204 |
| 6,332,150 B1 | 12/2001 | Khan et al. | |
| 6,360,236 B1 | 3/2002 | Khan et al. | |
| 6,535,909 B1 * | 3/2003 | Rust ........................... | 709/204 |
| 6,757,893 B1 | 1/2004 | Haikin et al. | |
| 6,993,710 B1 | 1/2006 | Coad et al. | |
| 6,993,759 B2 | 1/2006 | Aptus et al. | |
| 2002/0038388 A1 * | 3/2002 | Netter ......................... | 709/318 |
| 2002/0174010 A1 | 11/2002 | Rice, III | |
| 2004/0068505 A1 | 4/2004 | Lee | |

(Continued)

OTHER PUBLICATIONS

U.S. Appl. No. 10/973,186, Yu et al., "Event-Based System and Process for Recording and Playback of Collaborative Electronic Presentations", Oct. 25, 2004.*

(Continued)

*Primary Examiner*—Michael P Nghiem
(74) *Attorney, Agent, or Firm*—Lyon & Harr, LLP; Richard T. Lyon (57) ABSTRACT

An event-based system and process for recording and playback of collaborative electronic presentations is presented. The present system and process includes a technique for recording collaborative electronic presentations by capturing and storing the interactions between each participant and presentation data where each interaction event is timestamped and linked to a data file comprising the presentation data. The present system and process also includes a technique for playing back the recorded collaborative electronic presentation, which involves displaying the presentation data in an order it was originally presented and reproducing the recorded interactions between each participant and the displayed presentation data at the same point in the presentation that they were originally performed, based on the aforementioned timestamps.

3 Claims, 4 Drawing Sheets

U.S. PATENT DOCUMENTS

| | | | |
|---|---|---|---|
| 2004/0261013 | A1 | 12/2004 | Wynn et al. |
| 2005/0160395 | A1 | 7/2005 | Hughes |
| 2005/0234943 | A1 | 10/2005 | Clarke |
| 2006/0089820 | A1* | 4/2006 | Yu et al. ............... 702/186 |
| 2006/0101022 | A1* | 5/2006 | Yu et al. ............... 707/10 |

OTHER PUBLICATIONS

Booch, G., A. W. Brown, Collaborative development environments, www.jorvik.com/alanbrown/files/cdev4.1.pdf. Oct. 28, 2002.

Cheng, L.-T., S. Hupfer, S. Ross, J. Patterson, Jazzing up Eclipse with collaborative tools, Proc. of the 2003 OOPSLA Workshop on Eclipse Technology eXchange, Anaheim, CA, 2003, pp. 45-49.

Cook, C., W. Irwin, N. Churcher, The design and use of synchronous collaborative software engineering tools, TR-COSC May 2005.

Curtis, B., H. Krasner, N. Iscoe, A field study of the software design process for large systems, Comm. of the ACM, 1988, vol. 31, No. 11, pp. 1268-1287.

de Souza, C. R. B., D. Redmiles, L. -T. Cheng, D. Millen, J. Patterson, Sometimes you need to see through walls—A field study of application programming interfaces, Proc. of the 2004 ACM Conf. on Computer-Supported Cooperative Work (CSCW'04), pp. 63-71.

de Souza, C. R. B, D. Redmiles, P. Dourish, Breaking the code, Moving between private and public work in collaborative software development group'03, Nov. 9-12, 2003, Sanibel Island, Florida, pp. 105-114.

Dwyer, T., Collaboration and modeling solutions integrate with new tools to bolster developer productivity, Yankee Group, Sep. 2005, available at http://developers.sun.com/prodtech/javatools/jsenterprise/reference/whitepapers/YankeeGroup.pdf.

Fitzpatrick, G., T. Mansfield, S. Kaplan, D. Arnold, T. Phelps, and B. Segall, Instrumenting and augmenting the workaday world with a generic notification service called Elvin, Proc. ECSCW'99, Copenhagen, Denmark, Sep. 1999.

Froehlich, J. P. Dourish, Unifying artifacts and activities in a visual tool for distributed software development teams, 6th Int'l Conf. on Software Eng'g (ICSE'04), IEEE, Edinburgh, Scotland, United Kingdom, pp. 387-396.

Gallagher, K. B., J. R. Lyle, Using program slicing in software maintenance, IEEE Transactions on Software Eng'g, 1991, vol. 17, No. 8, pp. 751-761.

Grinter, R. E., Recomposition: Putting it all back together again, Proc. of ACM Conf. on Comp. Supported Cooperative Work CSCW'98, 1998, pp. 393-402.

Grinter, R. E., Using a configuration management tool to coordinate software development, Proc. of the Conf. on Organizational Computing Sys., 1995, pp. 168-177.

Gutwin, C., R. Penner, K. Schneider, Group awareness in distributed software development, Proc. of the ACM Conf. on Comp. Supported Cooperative Workshop, CSCW 2004, pp. 72-81.

Herbsleb, J. D., A. Mockus, T. Finholt, R. E. Grinter, Distance, dependencies and delay in a global collaboration, Proc. of the ACM Conf. on Comp. Supported Cooperative Workshop, CSCW 2000, Philadelphia, Pennsylvania, pp. 319-328.

Herbsleb, J. D., Atkins, D.L., Boyer, D.G., Handel, M. and Finholt, T.A., Introducing instant messaging and chat in the workplace, Proc. CHI 2002, Minneapolis, USA. 2002, vol. 4, No. 1, pp. 171-178.

Horowitz, S., J. Prins, T. Reps, Integrating non-interfering versions of programs, ACM Transactions on Programming Languages and Sys's, Jul. 1989, vol. 11, No. 3, pp. 345-387.

Lozano, M., Consistency maintenance framework for collaborative software modeling tools, Dec. 10, 2003, TCD-CS-2003-58.

Minör, S., B. Magnusson, A model for semi-(a)synchronous collaborative editing, Proc. of the European Conf. on Comp. Supported Cooperative Work, ECSCW'93, 1993, pp. 219-231.

Molli, P., H. Skaf-Molli, C. Bouthier, State treemap: An awareness widget for multi-synchronous groupware, Proc. of the Seventh Int'l Workshop on Groupware, 2001, pp. 106-114.

O'Reilly, C., P. Morrow, D. Bustard, Improving conflict detection in optimistic concurrency control models, 11th Int'l Workshop on Software Configuration Management, 2003, pp. 191-205.

Perry, D. E., H. P. Siy, L. G. Votta, Parallel changes in large-scale software development: An observational case study, ACM Trans. on Software Eng'g and Methodology, 2001, vol. 10, No. 3, p. 308-337.

Preguiça, N., J. L. Martins, H. Domingos, and S. Duarte, Data management support for asynchronous groupware, Proc. ACM Conf. on Computer-Supported Cooperative Work (CSCW'00), Philadelphia, PA, pp. 69-78, Dec. 2000.

Reis, C. R., R. P. de M. Fortes, An overview of the software engineering process and tools in the Mozilla project, Proc. of the Open Source Software Development Workshop, Newcastle. UK, Feb. 2002, pp. 155-175.

Sarma, A., Z. Noroozi, and A. van der Hoek, Palantír: Raising awareness among configuration management workspaces, Proc. of the Int'l Conf. on Software Eng'g, 2003, pp. 444-454.

Shümmer, T., H. M. Haake, Supporting distributed software development by modes of collaboration, Proc. of the Seventh European Conf. on Comp. Supported Cooperative Work, 2001, pp. 79-98.

Srivastava, A., J. Thiagarajan, C. Schertz, Efficient integration testing using dependency analysis, MSR-TR-2005-94, Jul. 2005.

Teasley, S., L. Covi, M. S. Krishnan, J. S. Olson, How does radical collocation help a team succeed?, Proc. of the Conf. on Comp. Supported Cooperative Work, 2000, pp. 339-346.

Venolia G., Bridges between silos: A Microsoft research project, Microsoft Research Software Improvement Group, Jan. 2005.

Nghiem, M. P., Office Action, U.S. Appl. No. 10/973,186, Dec. 20, 2005.

* cited by examiner

EVENT-BASED SYSTEM AND PROCESS FOR RECORDING AND PLAYBACK OF COLLABORATIVE ELECTRONIC PRESENTATIONS

CROSS-REFERENCE TO RELATED APPLICATIONS

This application is a continuation of a prior application entitled "AN EVENT-BASED SYSTEM AND PROCESS FOR RECORDING AND PLAYBACK OF COLLABORATIVE ELECTRONIC PRESENTATIONS" which was assigned Ser. No. 10/973,186 now U.S. Pat. No. 7,099,798, and filed Oct. 25, 2004.

BACKGROUND

1. Technical Field

The invention is related to interactive virtual team worksites, and more particularly to a system and process for providing an interactive computer network-based virtual team worksite that combines data storage, team members' presence information, interaction tools and a past history log into one virtual complex. In addition, an event-based system and process for recording and playback of collaborative electronic presentations is provided, which can be employed in conjunction with the virtual team worksite.

2. Background Art

A lot of large companies are global, and even smaller companies have people working on the same project but at different locations and/or times. Interaction between these distributed team members is much lower than co-located teams because of communication barriers, which in turn may affect the productivity of the whole team. Specifically, three problems with today's computer-based networks prevent information workers' distributed collaboration from being more effective. First, "unintended interactions" (i.e., ad hoc interactions rising from people's serendipitous meetings) are reduced because of lack of real-time presence information and convenient light-weight interaction tools. Second, the transition between the three modes of working—"working alone", "ad hoc meeting" and "scheduled meeting"—is not smooth and convenient because of the transition overhead and communication barriers between teammates. Third, the key elements essential to a project's life cycle—data, people and interactions tools—are separated.

In regard to the aforementioned presence information (i.e., what other members are doing and how they are doing it), this is crucial in collaboration, especially because it is the foundation for unintended interactions. However, most existing distributed collaboration systems provide presence information that is too vague and not very useful. For example, one popular tool for on-line collaboration used by distributed team members is instant messenger (IM). Unfortunately, current IM systems only indicate whether a team member is away or online, which still needs to be set manually instead of detected automatically. However, a person who is online, but not working on the team project at the moment, may not want to be bothered (e.g., invited to a team discussion). Thus, there is a need for project/team-specific presence information to be made available.

In regard to the aforementioned transition between the three modes of working, presence information has been found to cause a "dual tradeoff" problem: the more presence information a user reveals to others, the more awareness others have about him, and the less privacy he has; also, the more presence information a user retrieves about others, the more awareness he has about others, and the more disturbance he gets from such information. Thus, presence information should be made available only when the user can dedicate time to the team project.

In addition to the foregoing problems with distributed collaborations, it is also noted that existing presentation and conferencing systems rely on video-based recording: namely what a user sees on his/her monitor in an interaction session is recorded as a video file. There are several problems with this approach. First, it consumes very large amounts of storage space if a team wants to record all the sessions for the life-cycle of a project. Second, because today's video analysis techniques are still not mature, it becomes very hard to search through the documentary videos for specific information, or summarize a long session into short highlights of key points. Third, the recorded video can only be watched. Its content cannot be easily edited or modified by a user later on.

SUMMARY

The present invention is directed toward a system and process for recording and playback of collaborative electronic presentations, which overcomes the previously described problems with video-based recording. The present system and process resolves these issues by employing an "event-based recording" scheme. The event-based recording involves recording each interaction session as "data+user actions on the data", in that it logs in textual format the original data file being accessed, and the sequence of user actions on the data with timing information. Correspondingly, to playback this recorded session, a "simulation-based" approach is employed where the original data is opened, and then "ghost" users are simulated by exactly reproducing the same set of actions performed by these members during the original session and with the same timing. Thus, the same session is rendered as it happened. The advantages of this approach are first that there is a great saving on storage space. In addition, abundant semantic information is available for search and summarization because text retrieval and summarization techniques can be applied to the semantic events and associated meta data logged in textual format. And finally, the possibility of "changing the past" exists in that as the "ghost" members are re-enacting the past session, the member replaying the session can immerse himself or herself into this process and input their own actions to interact with the data.

More particularly, the event-based recording technique is first embodied in a system for recording collaborative electronic presentations involving capturing and storing the interactions between each participant and displayed presentation data where each interaction event is timestamped and linked to a data file associated with the presentation data. Unlike prior video-based recording schemes, only the recorded interactions and the existing data are used to reconstruct the presentation. No video is used at all. Essentially, when a presenter initiates a collaborative electronic presentation, he or she also elects to record the session. In response, the interactions between each participant (including the presenter) and the presentation data are captured and stored. In addition, each interaction event is timestamped and linked to the file associated with the presentation data.

The event-based recording technique is also embodied in a process for playing back the recorded collaborative electronic presentation via an interactive virtual team worksite over a distributed computer network. This process involves displaying a worksite window on the display to a team member logged onto the team worksite. Data and commands are entered by the team member playing back a recorded collaborative electronic presentation such that first a list of recorded collaborative electronic presentation sessions is displayed in the worksite window in response to a team member command to do so. Then, upon selection of a displayed recorded presentation session by the team member, information about the session is displayed in the worksite window. The recorded collaborative electronic presentation session selected by the team member is played back in a collaborative presentation sector of the worksite window in response to the team member's command to do so. This playing back involves displaying the presentation data from the associated data file in an order it was originally presented and reproducing the recorded interactions between each participant and the displayed presentation data at the same point in the presentation that they were originally performed, based on the aforementioned timestamps.

In one embodiment of the play back process, displaying the list of recorded collaborative electronic presentation sessions in the worksite window involves assigning a name to each session for display purposes and displaying a history sector of the window in which the list of recorded collaborative electronic presentation sessions is displayed by their assigned names. For example, the name assigned to each session could correspond with the name of the data file associated with the presentation data, and optionally with the time of the recording to avoid duplicate names.

In addition to displaying a list of recorded sessions in the history sector, once a session has been selected, a presentation timeline is displayed. This timeline is a visual representation of the recorded interactions between each participant and the displayed presentation data over the course of the presentation. The team member playing back a previously recorded session can zoom the timeline such that all or just a portion of the presentation is represented. Each time a new zoom level is chosen, the timeline is rescaled to fit the timeline area in the history sub-sector. The timeline includes a horizontal line representing the length of the presentation in terms of time and the zoom level, and short vertical lines representing recorded interactions each of which crosses the horizontal line at a point representing the relative time in the presentation that the interaction took place. The vertical lines can also be color-coded to indicate the type of interaction they represent. The timeline can also include a current portion indicator that points to the point in the presentation in the timeline that is currently featured in the collaborative presentation sector. It is noted that the aforementioned interactions include highlighting portions of the displayed data, using a pointer to call attention to a portion of the data, and/or modifying the data. In addition, the data types can include documents, spreadsheets, presentation slides, and the like.

In addition to the timeline, information about the selected presentation session can be displayed in the history sector of the worksite window in lieu of the aforementioned list of recorded collaborative electronic presentation sessions. This information can include a presentation event listing that provides an identification of the part of the presentation that is currently featured in the display area of the collaborative presentation sector and a list of all the recorded interactions between each participant and the displayed presentation data corresponding to that part of the presentation.

A team member that is playing back a recorded presentation session inputs commands to start and stop the playback. In addition, commands can be entered that pause the playback and then continue it from the point it was paused. Still further, a team member can enter a command to jump to a point in the presentation and continue the playback from that point.

In playing back a previously recorded session, a team member is presented with an option to record his or her interactions with the presentation data. If the interactions are recorded this involves capturing and storing the interactions between the team member and the presentation data, where each interaction event is timestamped and linked to a file associated with the presentation data. The list of recorded collaborative electronic presentation sessions would also include listings that allow a team member to play back a recorded collaborative electronic presentation session that includes the interactions of a team member that were captured and stored during a previous play back of a recorded presentation session. To accomplish this in one embodiment, the interaction data is stored in a file along with the interaction data associated with any other person whose interactions were captured and linked to the presentation data previously. Thus, during playback the interactions of a team member captured and stored during the play back of the previously recorded presentation session, along with those of any other person whose interactions were captured and linked to the presentation data previously, are re-enacted. Alternately, the interaction data captured from a team member playing back a recorded presentation session can be stored in a separate file. In this way, a team member wishing to play back a recorded session could elect to see the original session, or one just showing the interactions of a team member who previously played the session back. To take this latter concept further, the interactions of all team members, whether participating in the original session or later during a playback, could be stored in a separate file. In this way a team member wanting to play back a session can chose to replay the interactions of all, none, or any number of the team members that previously interacted with the presentation data. To facilitate this, for each session listing in the history sub-sector, a list of the participants whose interactions with the presentation data were captured and stored in a separate file would be included. The team member wishing to playback a presentation would select which (if any) of the recorded interactions are to be re-enacted. Only the interactions of the selected team members would be re-enacted.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
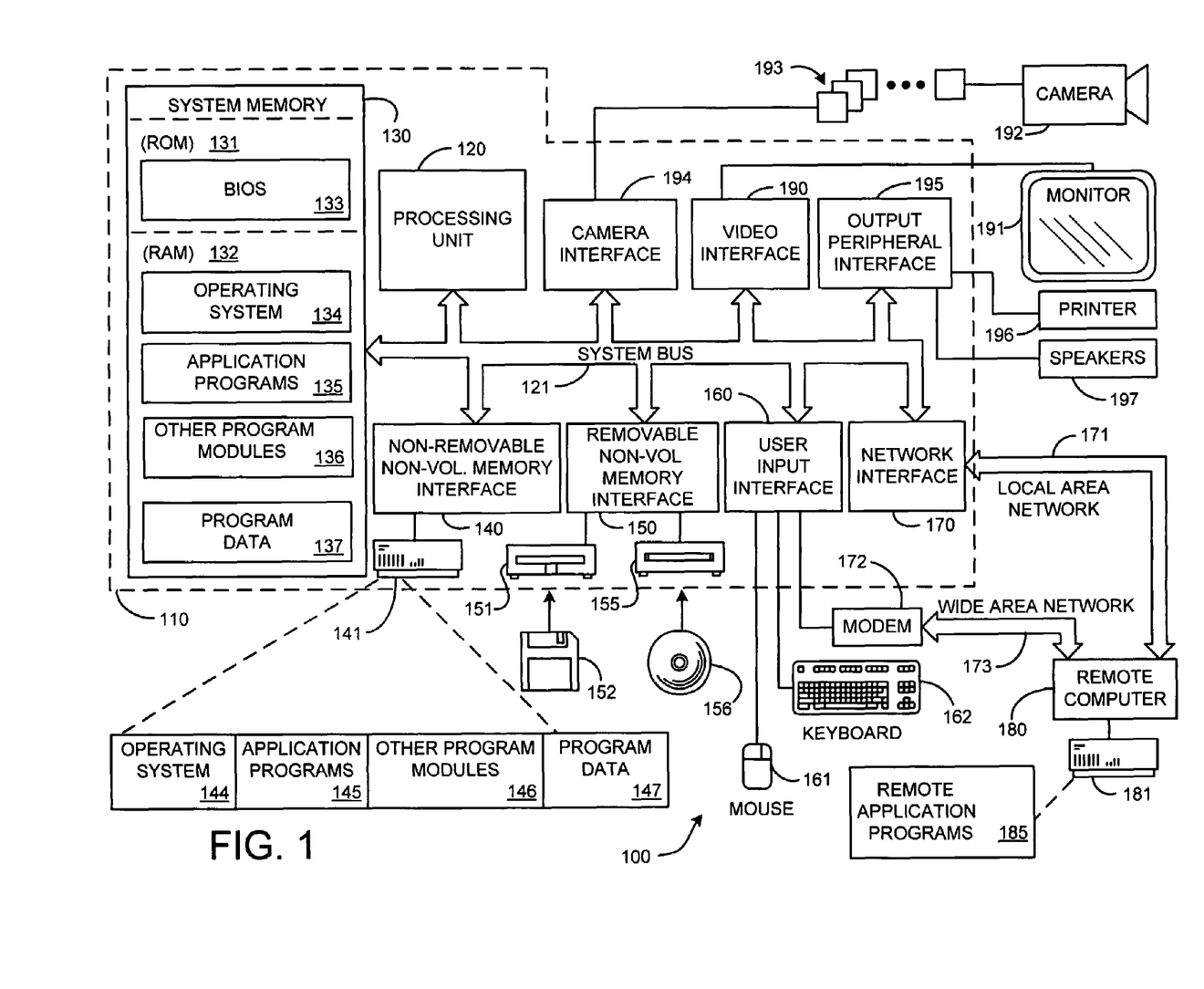
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. An audio/video (A/V) capture device 192 can also be included as an input device to the personal computer 110. The A/V output from the device 192 is input into the computer 110 via an appropriate A/V interface 194. This interface 194 is connected to the system bus 121, thereby allowing the images to be routed to and stored in the RAM 132, or one of the other data storage devices associated with the computer 110.

The computer 110 operates in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 The Virtual Team Worksite

Figure 2:
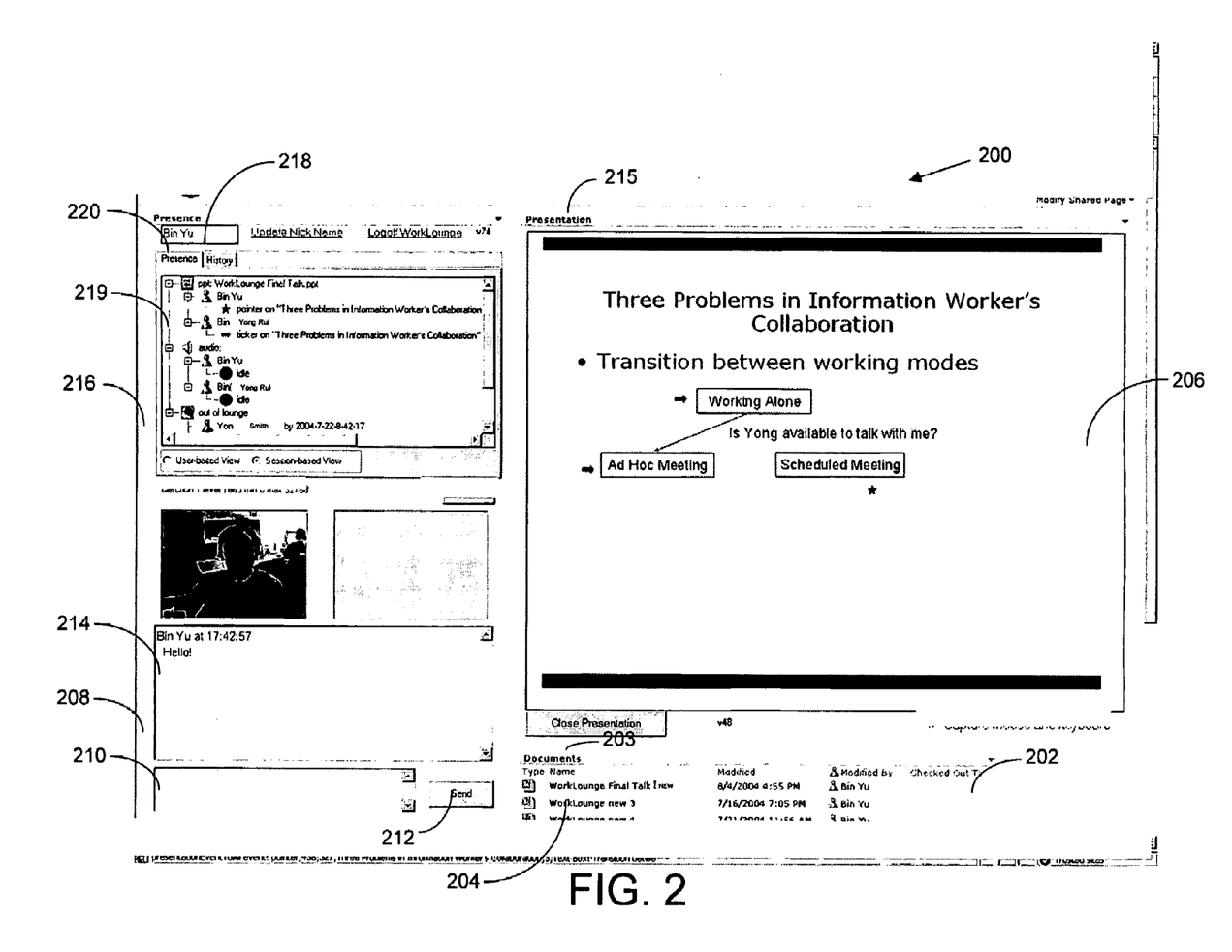
FIG. 2 shows an exemplary graphic user interface (GUI) window layout according to the present interactive virtual team worksite system and process.

The integrated virtual team worksite system and process combines data storage, people's presence information, conferencing tools and a past history log into one virtual complex assessable over a computer network (such as an intranet or the Internet). Everything a team would need related to a project is available in this integrated place. Thus, the worksite brings together the data, people and tools necessary for a team to collaborate on a project even though a team member may not be co-located or even working at the same time as other members. Generally, this is accomplished by integrating a shared data module, a unique presence module and various conferencing tool. An example of a graphical user interface (GUI) 200 that could be used to present these integrated elements to each team member is shown in FIG. 2.

2.1 Shared Data

The aforementioned shared data module provides team members access to shared documents and other shared data such as slide presentations, spreadsheets, and the like. In essence, data that is imported to the shared data module is stored and added to a list of shared data items 204. This list 204 is shown in shared documents sector 202 under the label "Documents" 203 in the exemplary GUI 200 of FIG. 2. A team member views the list of shared data 204 and can select and access any item via conventional selection methods applicable to GUIs. For example, this might involve placing a display screen cursor over the desired listing and double clicking a computer mouse to select the listed data. The selected data is then retrieved from storage and displayed in a workspace sector 206 so that team members can review and modify the data as desired. The way in which the selected data is displayed in the workspace sector 206, and its interactive features will be described in more detail shortly. Any shared data program can be employed as the shared data module of the present integrated worksite system and process. For example, in tested embodiments, Microsoft Corporation's SharePoint® team services software was employed as the basis for the shared data module. It is noted that SharePoint® includes security features that control access to the virtual team worksite. In this way access to the worksite can be restricted to authorized team members only.

2.2 Conferencing Tools

In one embodiment of the integrated worksite, the aforementioned conferencing tools include a chat module, audio module, video module and collaborative presentation module.

2.2.1 Chat Module

In the exemplary GUI 200 of FIG. 2, the chat feature is presented to team members in a chat sector 208. A team member can correspond with other members currently logged into the worksite by entering text (via conventional GUI data entry means such as a keyboard) and sending it for display. In the exemplary GUI 200 of FIG. 2, the member would type a question, response, or the like into a chat input area 210 and then select the "Send" button 212. The member's input is then displayed in the chat display area 214 along with the member's name and the time the input was posted, as shown in FIG. 2.

2.2.2 Audio Module

The audio module takes advantage of the previously described A/V capture device and speakers associated with a team member's computer for capturing audio and for playing audio transmitted to the computer from other team members. More particularly, the audio module transmits audio of the team member over the network to other team members, and receives audio from each other team member transmitting audio over the network. The received audio is played to the team member based on the member's instructions, as will be described shortly.

2.2.3 Video Module

The video module takes advantage of the previously described A/V capture device and display associated with a team member's computer for capturing video of the member and for playing the video transmitted to the computer from other team members. More particularly, the video module transmits video of the team member over the network to other team members, and receives video from each other team member transmitting video over the network.

Figure 3:
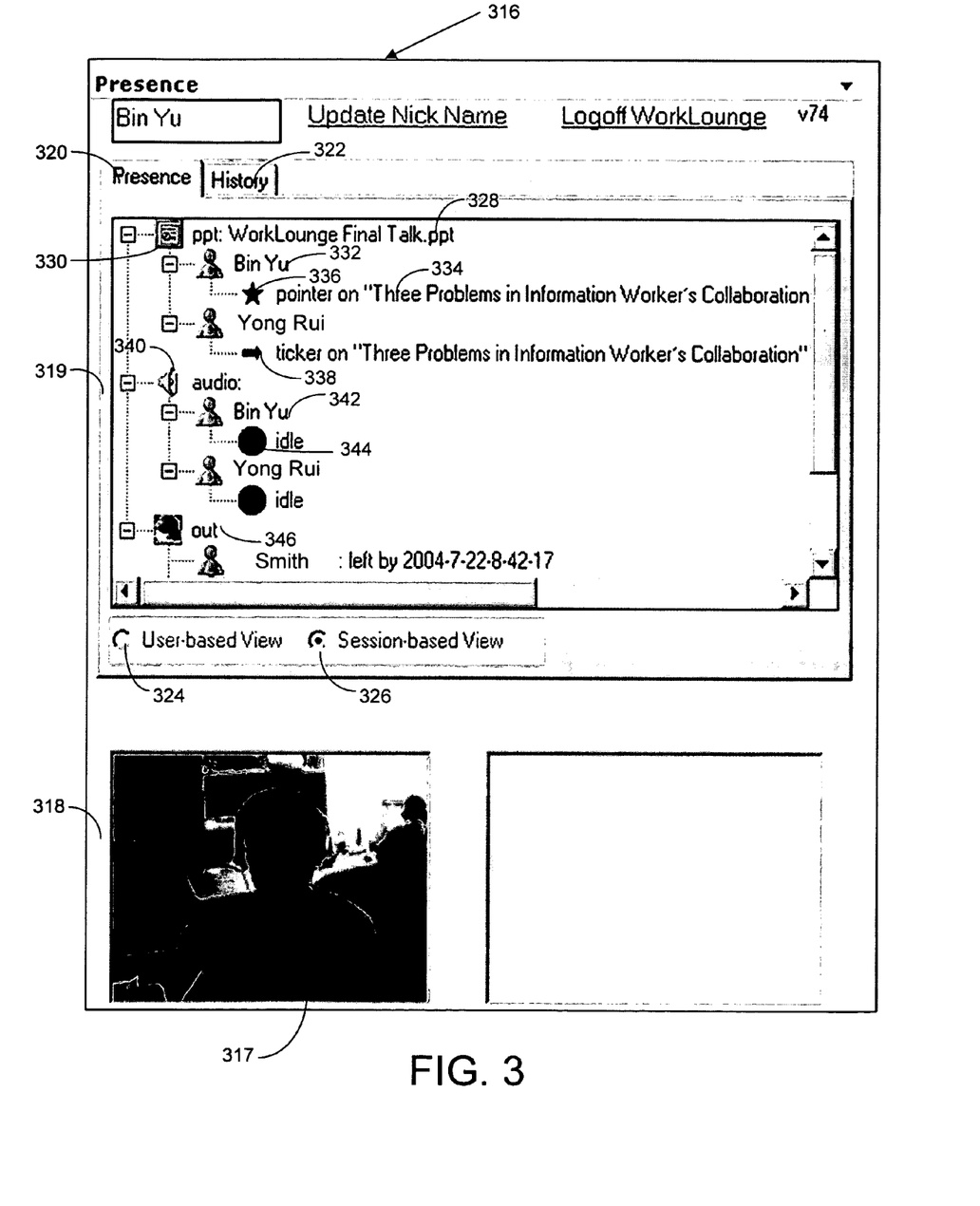
FIG. 3 shows an enlarged view of the presence sector of the GUI window layout of FIG. 2.

The received video is displayed in the worksite window, as can be seen in the exemplary GUI 200 of FIG. 2 and more readily in the enlarged view of the sector 318 shown in FIG. 3. More particularly, a video feed 317 from each participating member is shown in the video sector 318. In the depicted example there is no video feed from one of the logged in members so the area in the video sub-sector 318 established for that member is blank. It is also noted that a member can be more than just an individual. For example, a member could be a group of people, such as a group of people in a conference room. Further, a member can be a team member's second computer. Thus, a single member could have multiple presences on the worksite

2.2.2 Collaborative Presentation Module

The collaborative presentation module allows a team member to select data via the integrated shared data module and display it to all the other members who are currently logged onto the worksite. Each such member has the ability, dependent on permission from the presenting team member, to interact with the displayed data. This interaction can include highlighting portions of the displayed data, using a pointer to call attention to a portion of the data, or modifying the data as desired. In this way team members can collaborate on the preparation of a document or presentation, or one team member can present his or her work to the other members. For example, the presenting member could select a presentation slide he or she is working on and display it to the other members. This scenario is depicted in the exemplary GUI 200 of FIG. 2, where a slide of a presentation is shown under the "Presentation" label 215 in the workspace sector 206. Other interactions are also envisioned depending on the capabilities of the collaborative presentation program employed.

In tested embodiments of the present integrated worksite system and process, a power point viewer was employed as the collaborative presentation module to take advantage of its interactive features. In general, this program allows a team member to present data to other members and for the other participating team members to view and/or interact with the data as it is presented (including viewing the interactions of other members and the presenter). The data presented can be standard electronic presentation slides having text and animations. The data can also be images, web pages, or even a blank slide that acts as a whiteboard on which the team members can draw or type in text. The data can further be a shared view where the participating team members see the image currently displayed on the presenting members display. This is useful for demonstrating new software or the real-time manipulation of data on a spreadsheet, among other things. The data can also be a polling view in which participating members can vote on some issue put forth by the presenting member. Thus, a wide variety of data can be presented and interacted on by all the participating team members.

2.3 Team Member Presence

The aforementioned presence module is used to promote the chance for "unintended interactions" because all teammates that are in the worksite are provided detailed and real-time presence information about other teammates and are one click away from an ad hoc conversation with each other. This is generally accomplished by first using standard audio-visual (A/V) inputs from each logged-on member to allow each of these team members to see and hear the others. In addition, a current session listing is provided to each participating member. This current session listing indicates what sessions are currently happening at the virtual team worksite and which team members are involved. This listing can be organized in two different ways—namely by each session or by the name of the team members. The sessions that are listed include any presentation or interactive session that is going on in the collaborative presentation module and well as the chat module. In addition, the listings identify audio conversations that are occurring between team members via the A/V links. Further, the listings can specify members who are currently logged onto the worksite and a list of those who are not.

The foregoing features of the presence module are depicted in the presence sector 216 of the exemplary GUI 200 of FIG. 2 and in the enlarged view of the sector 316 shown in FIG. 3. For example, the presence sector 316 has an session listings sub-sector 319 that provides the aforementioned current session listings. In the example presence sector 316 of FIG. 3, the session listings sub-sector 319 is displayed by selecting the presence tab 320. The other tab 322 labeled "history" will be described shortly in conjunction with the description of the event-based recording module. Notice that when the session listings sub-sector 319 is active, there are view choices—namely a user-based view choice 324 and a session-based view choice 326. In the depicted example the session-based view choice 326 is selected, resulting in a session-based view being displayed in the session listings sub-sector 319. The session-based view organizes the current session listings according to session types, such as the ones described previously. In the depicted example, the first session type refers to what is being displayed and acted upon in the workspace sector (see 206 in FIG. 2). In this case it is a presentation slide identified by the heading 328 "ppt: WorkLounge Final Talk.ppt", which was derived from its title listed in the shared document sector (see sector 202 in FIG. 2) and from the type of data it represents. Also note that in the depicted example, an icon 330 is displayed adjacent the workspace sector session and represents this session. The icon 330 is used to facilitate quick identification of the session type by team members. The participating members 332 who are interacting with the presentation slide depicted in the workspace sector are listed under the workplace sector session heading 328. In this case it is the aforementioned team member and his laptop computer. Under the listing of each member 332 interacting with the presentation slide is an indicator 334 of what action is being performed. In the depicted case the indicator 224 specifies that a team member 332 has his pointer on a particular line of text in the slide depicted on his PC display monitor. In addition, it is indicated that a ticker is on the same line of text in the slide displayed on the screen of the aforementioned laptop computer. Icons 336, 338 are used for easy identification of the pointer and ticker, respectively. Other icons would be used to refer to other interactions such as highlighting and annotating. To initiate a collaborative presentation, a team member selects the data file containing the material that is to be presented (and optionally acted upon by other team members) from the listing 204 in the shared document sector 202 shown in FIG. 2. The document, presentation slides, spreadsheet, or whatever form the presentation data takes is displayed in the workspace sector 206 as described previously. It is also listed in the session listings sub-sector 319 as workspace sector session heading 312, as seen in FIG. 3. If another team member wants to interact with the displayed data, this can be accomplished using the presence module. For example, referring to exemplary presence sector 316 shown in FIG. 3, a member wanting to join a collaborative presentation session would select the session listing heading 328 associated with it. The member wishing to join the session would then see the current page, sheet, slide or the like (hereinafter collectively referred to as page) of the presentation in the workspace sector (206 in FIG. 2). The member can also interact with the displayed data as described previously. However, it is noted that this interaction may only occur in some presentation programs (such as Microsoft Corporation's Live Meeting) if the member has been empowered to do so by the member who initiated the collaborative presentation session. It is also noted that the aforementioned interaction may also entail a corresponding audio conversation between the members participating in the collaborative presentation session. This could be accomplished outside the present system and process, for example, by the use of a conference call. However, it could also be accomplished using the audio capabilities of the present system and process as will be described shortly.

The presence module can be configured to support multiple, parallel collaborative presentation sessions. This is accomplished in the exemplary presence sector 316 in FIG. 3, which depicts the session view of session listings, by creating a separate collaborative presentation line (not shown) whenever a team member initiates a session in the manner described previously. The names of the members participating in a session would be listed under the applicable collaborative presentation line along with an indication of what action they are currently engaged in as described previously. In this way, members currently logged into the worksite can join and leave any of the ongoing collaborative presentation session identified by a separate line in the session listings sub-sector 319. When joined in their name would appear under the line created for the ongoing presentation session, and would be removed when a member leaves the session.

The second session type displayed in the session listings sub-sector 319 in FIG. 3, refers to the audio feed from each participating member. An appropriate icon 340 is used for quick identification of this session type. As with the workspace session, the participating members 342 are listed below the audio line. In the exemplified case the team member and his laptop computer are indicated as being idle meaning no audio is being transmitted by either (which in the case of the team member would be via his PC). An icon 344 indicating the lack of audio is appended adjacent the idle indication. If, however, a team member were transmitting audio to the worksite, the indicator under their name would indicate sound was available. This indicator could be another icon, or perhaps a waveform representing the sound levels being received. These types of indicators are preferred over simply playing all the audio feeds as this could be distracting to a team member who is logged on to the site but not currently interested in listening to the ongoing conversations. There could also be a button (not shown) displayed next to each team member's name under the audio line that when selected toggles between enabling his or her audio feed to the listed audio session and disabling it. It is envisioned that a team member who is logged onto the worksite and wants to listen to an ongoing conversation of another member can do so. For example, the GUI could be configured so that when a team member "mouses over" the aforementioned indicator under the name of another team member that indicates an audio feed is available, the audio of that member would be played. Thus, a team member can selectively listen to ongoing conversations to decide if he or she would like to join in the audio session. It is noted that the GUI could also be configured so that when a team member wishes to monitor the active audio feed of another team member, a notification could be given to that other member that someone wants to listen in. Further, the GUI can be configured such that unless the other member agrees to be monitored, the audio is not played to the inquiring member.

If a team member wants to have a conversation with another member who is logged into the worksite, this can also be accomplished using the presence module and a list of members logged onto the worksite. For example, while not shown in FIG. 3, the session listings sub-sector 319 could include a list of members who are currently logged onto the worksite. Under the name of each such member would be an indicator identifying whether their audio feed is available. A member wanting to talk to another member would select the indicator under the name of another team member that indicates an audio feed is available. Note that a listing would include only those logged-on members that are not already participating in an audio session. The audio feed from the member "calling" the selected member would then be played to the selected member, and the audio feed from the selected member would be played to the "calling" member. In this way a conversation between the members is initiated and an audio session line would be added to the session listings. Other members can then join in the conversation, in the manner described previously. This would cause the joining member's audio to be played to all the other members participating in the conversation, and all the audio of the other members in the conversation would be played to the joining member. The audio feed of any member in the conversation that wishes to leave the session can be terminated by the leaving member selecting the aforementioned button (not shown) displayed next to that team member's name under the audio session line that enables and disables his or hers audio feed.

The presence module also can be configured to support multiple, parallel audio sessions between team members. This could be accomplished in the exemplary presence sector 316 depicted in FIG. 3 by creating a separate audio line (not shown) whenever a conversation is initiated between two team members. The names of the members participating in the conversation would then be listed under the new audio line along with indicators showing their audio feeds are enabled. Thus, the other members currently logged into the worksite can join in and leave any of the conversations identified by a separate audio line. When joined in their name and active audio indicator would appear under the separated audio line created for the ongoing conversation, and would be removed when the member leaves the conversation.

The third session type displayed in the session listings sub-sector 319 depicted in FIG. 3, is a listing 346 of all the team members that are not currently logged onto the worksite. In the example listing 316, the team members name is listed as well as when they last left the worksite. This feature of identifying which team members are logged onto the worksite and which are not has significant implications. It allows a line to be drawn between "public" and "private" space by whether the member is in or out of the Worksite. The idea is that when a team member is "logged off" a particular worksite, he or she wishes full privacy from this project's team members and also wants to get limited or no information about other team members which could be distractive. Thus, a member logs off the worksite to indicate to the other members he or she does not wish to participate in the project associated with the worksite at the present time. This minimizes distractions from the other team members. However, when this member wants to participate in the project and logs into the worksite, it is assumed that he or she is willing to publish/transmit all his or her project-related activities to the other members associated with this project. In turn, he or she can also be aware of other teammates' presence status and monitor their activities if they are logged on as well. The justification for this approach is first that both the concept and implementation are simple and straightforward—namely the team member only needs to log onto the worksite to get and release presence information, and log off for privacy. Secondly, people need this kind of presence information most when they are located at distributed places and cooperating closely on a project, and almost all of their interactions will be related to the project. Thus, they are mostly interested in knowing other teammates' activities related to the project, and in turn they are willing to let other teammates know what they are doing on the project. Finally, people on the same project team tend to know each other personally better if they can interact in the manner afforded by the present worksite. This lays the foundation for more detailed and more frequent interaction and facilitates the desired "unintended interactions".

The foregoing description of the session listings sub-sector 319 was directed toward the session-based view option. In regard to the user-based view option (not shown), this as mentioned earlier organizes the current sessions by the team members engaged in them. This view is advantageous when a team member wants to specifically know what a particular member is doing. This would be more difficult using the session-based view as the team member could be listed under numerous session types.

The fourth session type displayable in the session listings sub-sector 319 (although not shown in FIG. 3) involves the identification of team members involved in a written chat session. The listing looks much like the audio listing in that a chat line is displayed in the session listings sub-sector. An appropriate icon is used for quick identification of this session type, and the participating members are listed below the chat line.

It is noted that the sectors and sub-sectors shown in FIGS. 2 and 3 are meant as examples only and are solely intended to illustrate the features of the present worksite system and process. The look and operation of these sectors and sub-sectors could vary as desired as long as they serve the same purpose. It is also envisioned that other features useful to a particular project, and sectors/sub-sectors needed to support them, can be added as desired to enhance the worksite, and are within the scope of the present invention. The key is to integrate presence info, data and interaction tools.

The integration of the foregoing modules into a single worksite fulfills the goal of bringing together the data, people and tools necessary for a team to collaborate on a project even though a team member may not be co-located or even working at the same time as other members. First, the data is available directly from the worksite, as opposed to a team member having to go to a separate shared data site, access it, save it, and then transfer it to whatever collaborative presentation site is to be used to present the data. Further the integration of presence information provides opportunities to team members that are not available in a collaborative presentation program alone. For example, a member can see the topic of the collaborative presentation and who is participating, thereby assisting him or her in deciding whether to join in the session. The same is true for audio conversations between team members. By seeing who is talking to whom, and in some embodiments being able to monitor the conversation, a team member can decide whether to join the conversation. Still further, knowing who is not logged in tells a team member that a teammate does not want to interact on the project associated with the worksite at the present time. Thus, the logged-off team member will not be disrupted un-necessarily by other teammates. All this is far more than could be ascertained using a typical IM system. The integration of a chat module also enhances the usefulness of that tool. For example, in a stand alone chat system, a user sends a question or request and must wait to see if anyone sees it and answers. The user has no idea if other users are online or if they are in a position to respond to a question or response. However, in the present integrated system, a member knows if someone in the project group who can answer the inquiry is logged on and available. This collaboration between distributed team members on a common worksite with the tools they need and knowledge of the actions of the other team members fosters the unplanned interactions that at times spawn the best ideas.

2.4 Event-Based Recording

As mentioned previously, recording the actions of team members while logged onto the present worksite allows members not participating in a collaborative presentation session at the time it was held to still interact with a recorded version thereof via an event-based recording module. In one embodiment, the present system and process includes an event-based recording module that captures and stores team members' interactions. While a conventional video-based recording scheme could be employed, the unique event-based recording technique developed for this system and process has many advantages. Granted, there are other event-based recording systems. However, in all these other systems, even though they support even-based navigation (e.g., timelines), this is done on top of a recorded video. For example, if a user clicks on an event in the timeline, a corresponding portion of the video will be played back. This video-based scheme has drawbacks. First, for relatively long collaborative presentation sessions (as is common) the amount of video data that has to be transmitted and stored will be extremely large. In addition, when a session is stored as video, the semantics are lost. As a result it is difficult to search the data to find specific things of interest. For example, standard text retrieval techniques cannot be used to search video data. The event-based recording scheme according to the present invention overcomes these issues by eliminating the video.

More particularly, in the context of employing the present event-based recording and playback scheme with the worksite, take the example of a team member presenting a slide presentation to other members in the manner described previously. In this example, one member is making the presentation and there are other members watching via the worksite. In video based recording, the presentation (e.g., the slides and any annotations) is recorded as a video clip. Later a team member views the video by either playing it back linearly or non-linearly by selecting known events from a timeline. However, in the present event-based recording, no video is recorded. Actually, there is no need—the highest fidelity recording of the past activity is already available via the worksite—namely the activity happening again. Thus, in the present system and process, only the original presentation slide and events (user interactions with this presentation slide) are recorded, e.g., annotations, pointer locations, etc. During playback, the original presentation slide is played back and synchronized with the events to reproduce the presentation exactly as it was given. This is accomplished by timestamping all the team member interactions during the original presentation, including the commands by the presenter to change a page of the presentation. In this way, a page of the presentation can be changed during playback at the same point in the presentation as it was in the original presentation. In addition, the participating team member interactions associated with each displayed page can be reproduced at the same points in the presentation that they occurred in the original presentation.

When the present event-based recording and playback system and process is used with the virtual team worksite, a further advantage is realized. Since the subject data of the presentation is already stored and accessible through the aforementioned shared data module, the only additional information that is needed to record the session is the interaction information. This interaction data is much smaller than a video of the presentation, and so the net result is a significant decrease in the storage requirements. In addition standard text retrieval techniques can be used to search a recorded session to find points of interest—something that is not possible with video-based recording.

Figure 4:
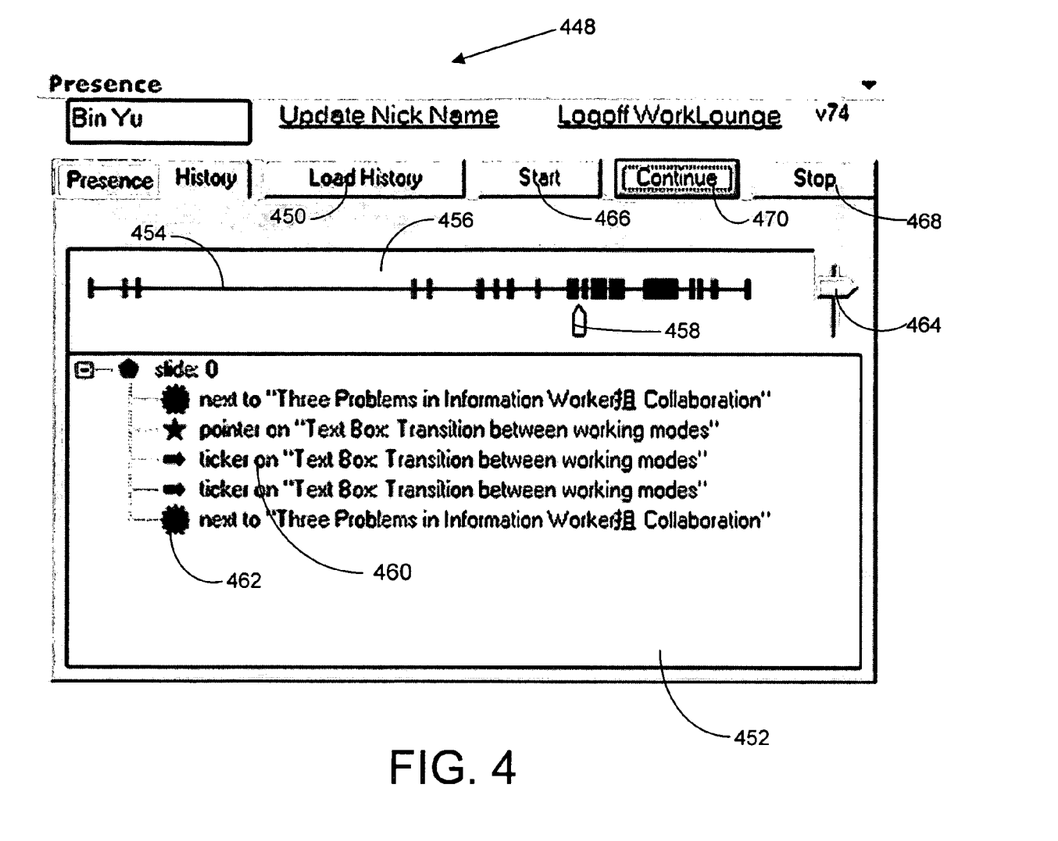
FIG. 4 shows a view of the history sector of the GUI window layout of FIG. 2.

In the exemplary GUI 200 shown in FIG. 2, the event-based recording module is used to generate a history sub-sector. Note the tab 218 adjacent the presence tab 220 at the top of the session listings sub-sector 219. When this tab 218 is selected, the history sub-sector is displayed in lieu of the session listings sub-sector 219. An example of the history sub-sector 448 is shown in FIG. 4. Whenever a member initiates a collaborative presentation session in the manner described previously, he or she is presented with an option to record the session. If the member elects to record the session, the interaction information is recorded and stored, and linked to the file associated with the presentation data. In addition, a title, such as the file name of the presentation data (and optionally the original presentation's time), is added to a recorded session list. This list (which is not shown in FIG. 4) is accessible by a member when the history sub-sector 448 is displayed. In the exemplary sub-sector 448 shown in FIG. 4, the member selects the "Load History" button 450 to access this list. In response, the list of recorded sessions is displayed in the display area 452 (although not shown in FIG. 4). A team member can then select one of the listed sessions. When a recorded session is selected, its timeline 454 appears in a timeline area 456. In essence the timeline 454 is a visual representation of the interaction events that occurred during the selected session. In the exemplary history sub-sector 448 shown in FIG. 4, the timeline 454 takes the form of a horizontal line representing the time axis with perpendicular vertical lines disposed along its length, each of which represents a different interaction event. An indicator is included that identifies the currently featured portion of the recorded presentation. This takes the form of a sliding arrow 458 in the exemplary history sub-sector 448. In addition to the timeline 454, event listings 460 appear in the display area 452 in lieu of the recorded sessions list when a session is selected. The event listings 460 identify the page, and any team member interactions associated with that page, at the point of the presentation currently being replayed. In the case where the recorded session is first accessed, this would be the first page associated with presentation. As the selected session is replayed, the sliding arrow 458 moves from the beginning of the timeline 454 at the far left to the end of the timeline at the far right. In addition, it always points to the location on the timeline 454 representing the part of the presentation currently being replayed. At the same time the interaction events listed in the event listings 460 change to correspond to the current part of the presentation being replayed, including the page number. The events in the event listings 460 can have icons 462 displayed adjacent the event description for easy identification of the event type, as shown in FIG. 4. There can also be a zoom feature that varies the resolution of the timeline 454. In other words, the displayed timeline can vary from representing the entire presentation to some prescribed small portion of it depending on the zoom setting. This zoom feature allows a member to see the event lines more clearly, especially when many events are occurring in the same short block of time. The zoom feature is particularly useful where the event lines are color coded so that a member can readily identify an event by the color of its event line on the timeline itself. This aids the member in finding a particular portion of the presentation they are interested in replaying. The color coding can also be coordinated to match the color of the icon 462 display adjacent the corresponding event description in the event listings 460. In the exemplary history sub-sector 448 shown in FIG. 4, the zoom feature is implemented using the slider 464, with which the member can select a desired resolution level by moving it up or down.

A team member replaying a recorded session can start the replay by selecting the "Start" Button 466 shown in the exemplary history sub-sector 448 of FIG. 4. When the start button 466 is selected, the event-based recording module play backs the presentation while reconstructing all the member interactions that occurred during the session including the change page commands entered by the presenting member. The data is displayed in the workspace sector (206 in FIG. 2) of the worksite window of the team member who is playing back the session. The presentation appears just as it did when it was originally given and includes all the participating team member interactions which appear at the same point in the presentation as they did when it was originally presented. The aforementioned event timestamps relative to the displayed page are used to accomplish this task.

The team member playing back a recorded session can pause the playback and then continue it from where it left off, or stop the playback altogether. In the exemplary history sub-sector 448 shown in FIG. 4, the "Stop" button 468 is selected to stop the playback, and the "Pause/Continue" button 470 is used to pause and continue the playback. It is noted that the label in the Pause/Continue button 470 changes depending on the status of the playback. When the playback is running, the button 470 has a "Pause" label (not shown). When the playback has been previously paused, the button 470 has a "Continue" label as shown in the example of FIG. 4. The member can also select a specific portion of the selected session that he or she wants to view, and can jump forward or back in the presentation. This is done in the exemplary history sub-sector 448 by dragging the sliding arrow 458 along the timeline to the desired point in the presentation. The zoom feature can be used to more precisely choose this desired point.

A team member playing back a recorded session is given the option to record his or her interactions, similar to the way a presenter has the option to record the original session. If the team member selects the option to record his or her interactions during playback, they are stored and can be selected and played back in the future. There are several ways that the interaction data, including such data recorded during a team member replaying a recorded session can be retrieved. One of the most straight forward ways is to link the interactions to the presentation data associated with that session. Under this scenario, the interactions of each member participating in an original session would be saved as a single file and have a single listing in the recorded sessions list. In addition, when a team member records their interactions while playing back a session, a separate file would be created and stored as a recorded session. This new file could just contain the interactions of the team member playing back the session, or it could be a combined file containing the interactions of the original participants plus the team member playing back the session. In the latter case, a team member who selects a recorded session that includes the interactions of a member who recorded them during a playback of a previous session, has the option of recording and combining his or her interactions as well. In this way, a series of related sessions is built, with the most recently recorded session containing all the interactions of the original participants and each member who later recorded their interactions during playback.

Another recording scenario involves separately recording the interactions of each team member participating in the original session or subsequently during a playback of a session. This recording scenario can be more efficient in terms of storage requirements since all the interactions of other members are not included in the session file associated with a team member who records their interactions during playback. In addition, this scenario provides a higher degree of versatility to a team member wanting to play back a recorded session, as they can choose whose interactions are played back. For example, to play back a recorded session in the alternative recording scenario, a team member would select a recorded session from the recorded sessions list as described above. However, in addition to the session listing, there would also be a sub-listing identifying each member that had their interactions associated with the session recorded, either in the original session or afterwards during playback. The team member playing back the session would select which other member's interactions are to be played back. This could entail none, in which case just the presentation data itself (and perhaps the presenter's interactions) are replayed. Alternately, the team member playing back the recorded session could select any number or all of the other recorded team member actions to be played back with the session presentation data.

It is noted that while the foregoing description involved integrating the present event-based recording and playback system and process with the previously described virtual team worksite, this need not be the case. In general, the present event-based recording and playback system and process can be used the record and playback any collaborative electronic presentation.

3.0 Additional Embodiments

While the invention has been described in detail by specific reference to preferred embodiments thereof, it is understood that variations and modifications thereof may be made without departing from the true spirit and scope of the invention. For example, the foregoing description was geared toward applying the present system and process to a worksite where team members involved in the same project would interact. However, the invention is not limited to just this type of application. For instance, the system and process could be design as a technical support site where customers would log on to get advice and assistance on a product. Further, rather than keying the site toward individual presences, the participants could be categorized by their expertise. Thus, the member identifiers would not be names of a particular person, but an expertise identifier, which may refer to different people at different times or refer to a group of people. In this way the support site would be role-based rather than individual-based.

Further, in addition to recording the collaborative presentation sessions and subsequent team member interactions via the above-described event-based recording scheme, other events occurring on the worksite could also be recorded. For example, the written chat correspondence and the audio conversations between team members could be recorded. In regard to the chat correspondences, these could be handled by the recording module in a way similar to the collaborative presentation sessions. For example, the team member initiating the chat session would elect whether the session is to be recorded. If so, the identity of the member entering text and the time it was entered would be captured as well as the text itself. Since it is known what team member input to the chat session and when, it is possible to construct a timeline similar to that constructed for the collaborative presentation sessions. In this case the vertical bars would represent a team members input. In addition, a recorded chat session could be listed in the recorded session list. A recorded chat session would be selected and played back similar to a collaborative presentation session. For example, a team member would select he desired chat session listing from the session listings displayed in the history sub-sector. A timeline of the chat session would then appear in the timeline area, and could be manipulated as described previously. The playback of the chat session could appear in the display area of the history sub-sector in lieu of the recoded session list, or it could be replayed in the display area in the chat sector.

In regard to a recorded audio session, this could be handled as follows. A team member initiating the audio session would elect whether the session is to be recorded. If so, the identity of the members participating in the audio session would be captured as well as their audio feeds. In this case, a timeline would be impractical unless it is known what team member spoke when. However, it is possible to list the recorded audio in the recorded session list displayed in the history sub-sector. This could take the form of a listing identifying it as an audio session and identifying the team members who participated. A recorded audio session would be selected from the list by a team member wishing to hear it, and the stored audio feeds from the original participating members would be synchronized as needed and played back to the selecting team member via conventional means.

Wherefore, what is claimed is:

1. An event-based recording system for recording collaborative electronic presentations in which a plurality of participant's interact with displayed presentation data on one or more computing devices which are in communication with each other, the system comprising:

a general purpose computing device comprising computer storage media;

a computer program stored in said computer storage media comprising program modules executable by the computing device, wherein the computing device is directed by the program modules of the computer program to:

initiate the collaborative electronic presentation comprising displaying said presentation data on said computing devices of each participant and inquiring of a participant who is presenting the collaborative electronic presentation to the other participants whether the presentation session is to be recorded or not, and capture and store the interactions between each participant and the displayed presentation data in said computer storage media only in response to the presenting participant's election to do so, wherein each interaction event captured and stored is timestamped and linked to a file comprising the presentation data.

2. A computer-implemented process for recording collaborative electronic presentations in which a plurality of participant's interact with displayed presentation data on one or more computing devices which are in communication with each other and which comprise computer storage media, comprising using a computer to perform the following process actions:

initiating the collaborative electronic presentation by displaying said presentation data on said computing devices of each participant and inquiring of a participant who is presenting the collaborative electronic presentation to the other participants whether the presentation session is to be recorded or not; and capturing and storing the interactions between each participant and the displayed presentation data in said computer storage media only in response to the presenting participant's election to do so, wherein each interaction event captured and stored is timestamped and linked to a file comprising the presentation data.

3. A computer-implemented process for recording collaborative electronic presentations in which a plurality of participant's interact with displayed presentation data on one or more computing devices which are in communication with each other and which comprise computer storage media, the process comprising:

an initiating step for initiating the collaborative electronic presentation by displaying said presentation data on said computing devices of each participant and inquiring of a participant who is presenting the collaborative electronic presentation to the other participants whether the presentation session is to be recorded or not; and a capturing and storing step for capturing and storing the interactions between each participant and the displayed presentation data in said computer storage media only in response to the presenting participant's election to do so, wherein each interaction event captured and stored is timestamped and linked to a file comprising the presentation data.

* * * * *